United States Patent
Qadri et al.

(10) Patent No.: US 9,051,186 B2
(45) Date of Patent: Jun. 9, 2015

(54) SILICON CARBIDE SYNTHESIS FROM AGRICULTURAL WASTE

(71) Applicants: Syed B Qadri, Fairfax Station, VA (US); Ame W Fliflet, Alexandria, VA (US); M Ashraf Iman, Great Falls, VA (US); Bhakta B Rath, Oakton, VA (US); Edward P Gorzkowski, III, Odenton, MD (US)

(72) Inventors: Syed B Qadri, Fairfax Station, VA (US); Ame W Fliflet, Alexandria, VA (US); M Ashraf Iman, Great Falls, VA (US); Bhakta B Rath, Oakton, VA (US); Edward P Gorzkowski, III, Odenton, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 111 days.

(21) Appl. No.: 13/791,549

(22) Filed: Mar. 8, 2013

(65) Prior Publication Data
US 2013/0272947 A1 Oct. 17, 2013

Related U.S. Application Data

(60) Provisional application No. 61/622,588, filed on Apr. 11, 2012.

(51) Int. Cl.
*C01B 31/36* (2006.01)
*B82Y 40/00* (2011.01)
*B82Y 30/00* (2011.01)

(52) U.S. Cl.
CPC ............... *C01B 31/36* (2013.01); *B82Y 40/00* (2013.01); *C01P 2004/16* (2013.01); *C01P 2004/64* (2013.01); *B82Y 30/00* (2013.01)

(58) Field of Classification Search
CPC .................................................... C01B 31/36
See application file for complete search history.

(56) References Cited

U.S. PATENT DOCUMENTS 4,284,612 A * 8/1981 Horne et al. .............. 423/345
5,108,729 A * 4/1992 Gerhold et al. ........... 423/346

OTHER PUBLICATIONS

Filsinger et al. Silica to Silicon:Key Carbothermic REactions and Kinetics; J. Am. Ceram. Soc., 73(6) 1726-32; 1990.*

* cited by examiner

*Primary Examiner* — Guinever Gregorio
(74) *Attorney, Agent, or Firm* — US Naval Research Laboratory; Stephen T. Hunnius (57) ABSTRACT

This disclosure concerns a method of making silicon carbide involving adding one from the group of rice husk material, sorghum, peanuts, maple leaves, and/or corn husk material to a container, creating a vacuum or an inert atmosphere inside the container, applying conventional heating or microwave heating, heating rapidly, and reacting the material and forming silicon carbide (SiC).

11 Claims, 10 Drawing Sheets

3C-SiC Synthesized from MW of Rice Husk

SILICON CARBIDE SYNTHESIS FROM AGRICULTURAL WASTE

REFERENCE TO RELATED APPLICATION

This application is a non-provisional of, and claims priority to and the benefits of, U.S. Provisional Patent Application 61/622,588 filed on Mar. 11, 2012, the entirety of which is hereby incorporated by reference.

BACKGROUND

Silicon carbide, (SiC), is an important ceramic material for technological applications at extreme temperatures due to its exceptional physical and mechanical properties, such as high hardness, high thermal conductivity, low thermal expansion and resistance to erosion, corrosion and oxidation. SiC is also used as a reinforcement material in metal matrix composites such as aluminum.

Components fabricated from SiC materials have surfaces that come close to the hardness of diamond and possess excellent resistance to abrasion.

Recently, SiC nanowires and nanorods have attracted interest because of their novel physical properties resulting from quantum confinement. The electrical and optical properties due to low-dimensional nanostructures can be tailored for potential applications in nanoelectronics, nanosensors, and biotechnology. Nanocrystalline materials have mechanical properties that are largely governed by their ultimate sizes due to their large surface areas where most of the atoms are localized.

Consequently, it is possible to produce nanocrytalline/nanorod composites that are superhard materials that have promise for applications in the emerging field of miniaturized moving parts in microelectro-mechanical systems. In solid state electronic devices, quantum well (QW) structures play an important role where the charge carriers are confined at a nanometer length scale.

Recently, to avoid the effects of different chemical species in hetrostructure superlattice devices, SiC has been proposed as a promising candidate material of choice due to the presence of two stable and well-understood polytype phases. These α (4H) and β (3C) phases provide a variation of 1 eV energy gap. It was proposed that the 3C inclusions in 4H or 6H SiC behave like quantum wells. In addition, it is very promising material for power electronics and biomedical applications due to its high breakdown voltage and chemical inertness, respectively.

Discovery of new forms of SiC such as nanoporous structures have opened new horizons of applications in electronics. In addition, nanocrystalline SiC can have important applications in gem, optical, and metallurgical polishing, and Ni—SiC composite coatings for integrated circuit engine components.

Silicon carbide has many polytypes arising from the different scheme of stacking layers of C and Si atoms; the most common (α-SiC, 4H) is formed at temperatures greater than 1700° C. and has a modified hexagonal crystal structure (Wurtzite). The beta configuration (β-SiC, 3C), exhibits a zinc-blende crystal structure (diamond), and can be formed at temperatures below 1700° C. Due to the close proximity of silicon and carbon on the periodic table, the silicon to carbon bonds are highly covalent in nature.

In many of the applications for SiC nanostructures, large quantities are required and must be produced using a simple, inexpensive method. It is also important to note that currently there is a significant problem in sustainability due to the large quantities of rice husk that are a byproduct of white rice. The elemental composition of rice consists of elements such as Si, C, Fe, Mn, Ca etc. Because large quantities of rice are being consumed every year generating millions of tons of rice husks per year, disposing this agricultural waste is a big challenge.

Burning the rice husks in air only produces the extremely fine silica ash which poses health hazard. Therefore it is important to identify a means to successfully eliminate this waste, or better yet, repurpose it towards a useful end.

It has been shown that rice husk material provides an appropriate precursor material for the formation of SiC nanostructures via various techniques as well as from other methods. Silicon carbide can be produced by processes involving multiple steps consisting of heating rice husks in an inert atmosphere to temperatures higher than 1300° C. A single step method also was adopted by using plasma reactor using graphite electrodes.

In this disclosure, we describe a novel, simple, and single-step process in which raw rice husks, sorghum, peanuts, walnuts, almonds, pistachios, nut shells, maple leaves, fruit pits such as from dates, peaches, mango, and corn husk materials and others that contain silica can be converted directly to a collection of cubic β-SIC nanostructures using a method involving rapid heating in a vacuum using conventional heating or a millimeter-microwave beam that increases the localized temperature up to 1900° C.

SUMMARY OF DISCLOSURE

Description

This disclosure involves a new method for the formation of abundant quantities of SiC from rice husk, sorghum, peanuts and peanut shells, walnuts, almonds, pistachios, nut shells, maple leaves, fruit pits such as from dates, peaches, mango, and corn husk materials and others that have silica content using conventional heating or microwave processing and the formation of the nanoparticle and nanorods of SiC in abundant quantities in a pure form using an inexpensive processing of agriculture waste.

Silicon carbide, SiC, is an advanced ceramic material that has been in existence for many years but is finding important technological applications at extreme temperatures because of its high hardness, thermal conductivity, and resistance to erosion, corrosion and oxidation.

SiC is also included among the family of reinforcement materials in metal matrix composites such as aluminum. Indeed, components fabricated from SiC materials have surfaces that come close to the hardness of diamonds and possess excellent resistance to abrasion. Nanocrystalline materials have mechanical properties that are largely governed by their ultimate sizes due to their large surface areas where most of the atoms are localized.

Consequently, it is possible to produce nanocrytalline/nanorods composites that are superhard materials which will have promise for applications in the emerging field of miniaturized moving parts in microelectro-mechanical systems. Additionally, nanocrystalline SiC can have important applications in gem polishing, optical polishing, metallurgical polishing, and Ni—SiC composite coatings on integrated circuit engine components.

DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

DETAILED DESCRIPTION OF THE INVENTION

Samples of rice husks were transformed to β (3C)—SiC by microwave processing in controlled conditions of temperature in a vacuum. This simple and fast way of producing the powdered samples of silicon carbide is technologically important if this material is to be used for electronics, sensors, biotechnology and other applications.

Using x-ray diffraction it was found that the microwave processed sample at 1900° C. consists of β (3C)—SiC phase. Raman scattering measurements confirmed the formation of β (3C)—SiC phase.

The transmission electron microscopy revealed the presence of stacking faults along the [111] direction. The presence of 6H/4H stacking faults in 3C phase is explained in terms of their total energies. The presence of these stacking faults with a ~1 eV band offset between the host 3C and hexagonal stacking fault imply that these stacking faults provide a conduction barrier, and the interfaces between the stacking fault and host lattice acts as a heterojunction that may provide potential utility for various opto-electronic applications.

Silicon carbide has many polymorphs; the most common (α-SiC) is formed at temperatures greater than 1700° C. and has a hexagonal crystal structure (Wurtzite). The beta modification (β-SiC), with a zinc blende crystal structure (diamond), is formed at temperatures below 1700° C. Silicon carbide, due to the close proximity of silicon and carbon on the periodic table, is a highly covalent material that forms tetrahedral coordination between carbon and silicon atoms. These tetrahedra form a close-packed structure and occur in the alpha and beta phases. Beta silicon carbide takes the diamond cubic structure and is a very stable structure.

In this disclosure, we describe a unique and fast single step process in which the raw rice husks, sorghum, peanuts and a variety of other nuts and/or the shells, fruit pits from various fruits such as dates, peaches, mango, maple leaves, and/or corn husk materials, and/or various others that have silica content, some of which can considered to be agricultural waste, are converted directly to a cubic β-SiC using a rapid heating in a vacuum using conventional heating or a millimeter-microwave beam to a temperature reaching 1900° C. In addition to corn husk materials, either the stalks or leaves will produce SiC as both have a high enough silica (SiO2) content. In addition to peanuts and peanut shells, any nuts such as pistachios, almonds, walnuts, etc. will produce SiC and give similar results. Furthermore, this list is only meant to be illustrative and not exhaustive as, for an additional example, leaves that have high silica content will also produce SiC by our unique and simple process.

Figure 3:
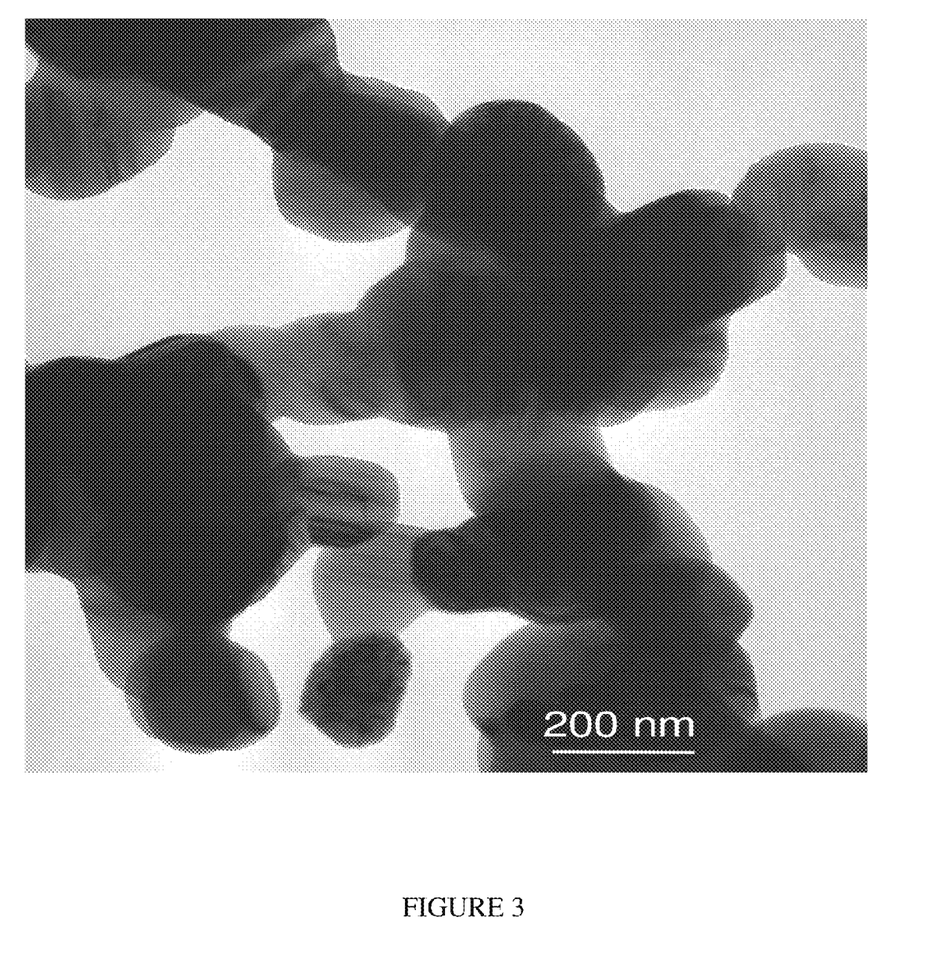
FIG. 3 is a TEM micrograph of SiC samples obtained after microwave processing them at 1900° C. in vacuum. SiC powder particles get sintered to one another. Their sizes vary between 100-300 nm in diameters.

FIG. 3 shows the x-ray diffraction scan of as-synthesized sample from rice husk after processing at 1900° C. in the microwave set-up. Clearly all the peaks are identifiable with β-SiC phase. The x-ray data analysis shows a lattice parameter of 4.359±0.003 Å which is in agreement with the equilibrium lattice parameter of 4.3589 Å. The crystallite size calculated from the full width at half maximum (FWHM) of (111), (220) and (311) diffraction peaks of β-SiC phase and Scherrar's formula is about 15 nm.

Figure 5:
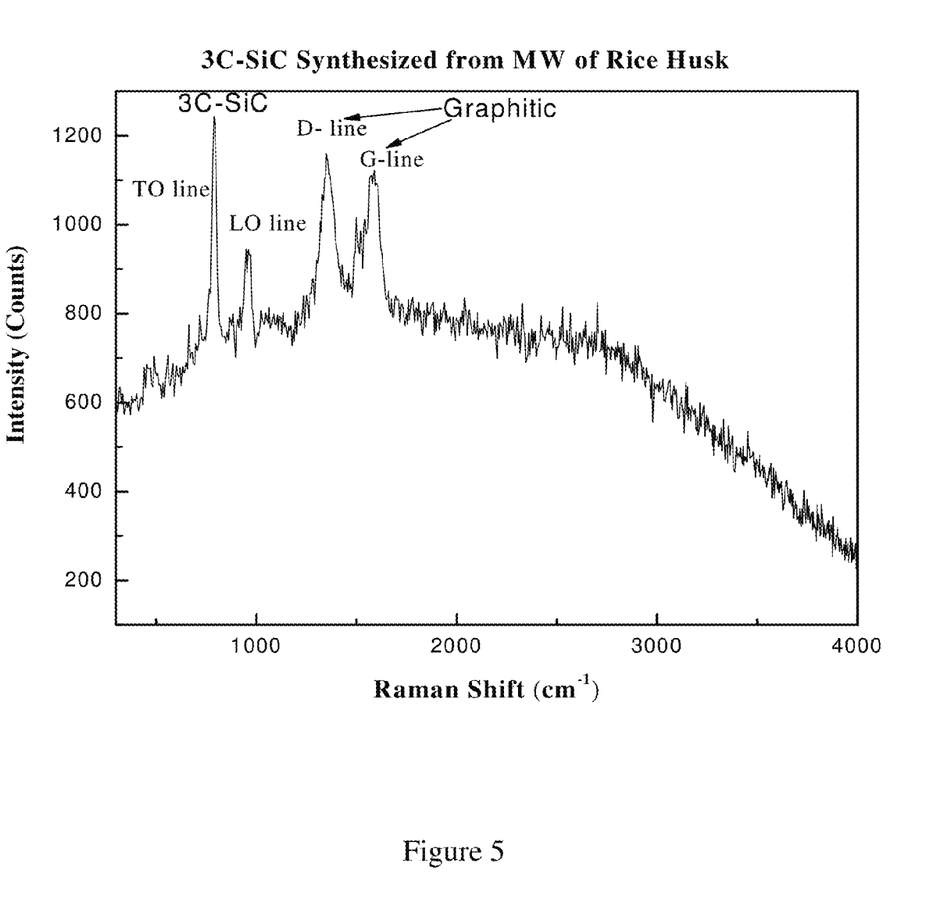
FIG. 5 illustrates Raman scattering data of microwave processed rice husk sample at 1900° C. in vacuum showing the TO and LO line of β-SiC and D and G lines of graphitic like material.

This analysis was also confirmed by Raman measurements shown in FIG. 5 where the TO and LO mode of β-SiC phase are identified.

EXAMPLE 1

A compact of compressed rice husk material is rapidly heated in a vacuum by a millimeter-wave beam to a temperature of about 1900° C., held at this temperature for a few minutes, and then cooled. During this process the rice husk material reacts to form silicon carbide and other products.

The frequency of the beam was 83 GHz, the total beam power was about 5 kW, and the power density was about 0.3 $kW/cm^2$.

The rice husk compact was held in a covered boron nitride crucible with a view hole for temperature measurement. A BN crucible was used because it is able to withstand the millimeter-wave beam and does not couple to it.

The compact was directly heated to high temperature by the intense 83 GHz beam. The synthesis of SiC was verified by x-ray diffraction measurements and Raman spectroscopy.

The modest (mechanical pump) vacuum environment prevents oxidation and silica formation.

Heating to temperatures below 1500° C. did not produce SiC.

EXAMPLE 2

Samples of rice husks were obtained. The husks were milled into a fine powder using a SPEX jar mill in a Polycarbonate jar with Polytetrafluoroethylene milling media. The rice husk powder was mixed in a mortar and pestle with a Polyvinyl alcohol (PVA) binder in a ratio of 0.95 rice husk to 0.05 PVA by weight.

Several 0.5 in. pellets were then pressed using a Carver press and homemade die set. A compact of compressed rice husk material was rapidly heated in a vacuum using a millimeter-wave beam to a temperature of about 1900° C., held at this temperature for a few minutes, and then cooled.

The total heating and cooling time using this method was 10 min. During this process the rice husk material reacts to form SiC and other products.

The frequency of the beam was 83 GHz, the total beam power was about 5 kW, and the power density was about 0.3 $kW/cm^2$ with the microwave radiation directed at the sample.

The rice husk compact was held in a covered boron nitride crucible with a thru hole provided to allow for accurate temperature measurements using an optical pyrometer. A BN crucible was used due to its ability to withstand the millimeter-wave beam and not couple to it, thereby ensuring the heat was locally delivered to the rice husk only.

Following the thermal treatment, the pellets were structurally characterized using electron microscopy on a JEOL JSM-7001FLV SEM and for further nanostructure analysis via TEM, samples were prepared by transferring a few drops of alcohol containing fine rice husk powder to a carbon coated fine mesh Cu-grid, and were imaged using Phillips CM 30 and JEOL 2200 FX transmission electron microscopes.

X-ray diffraction data was collected using a Rigaku 18 kW generator and a high resolution powder diffractometer. Monochromatic CuKα radiation was used for all scans.

In an effort to verify the crystalline phase of the SiC nanostructures and the other components within the subsequent powder created through this process, Raman scattering of the compact was stimulated using the 514 nm laser line of a Coherent Innova 90 Argon Ion laser.

The laser line was focused on the sample through a 100× 0.75 NA Mitutoyo objective providing a laser spot<1 μm in diameter. The Raman scattered light was collected in back-reflection geometry through the same objective and was focused through a 200 μm optical fiber onto the thermoelectrically cooled CCD array of an Ocean Optics QE65000 spectrometer. Reflection spectra were acquired with a Nicolet Continuum FT-IR microscope using a 15×(0.58 NA) objective.

Rice husk pellets were processed in a microwave setup at temperatures up to 1900° C. both in air and vacuum atmospheres and in general produced a black powder after it was removed from the chamber.

Figure 1:
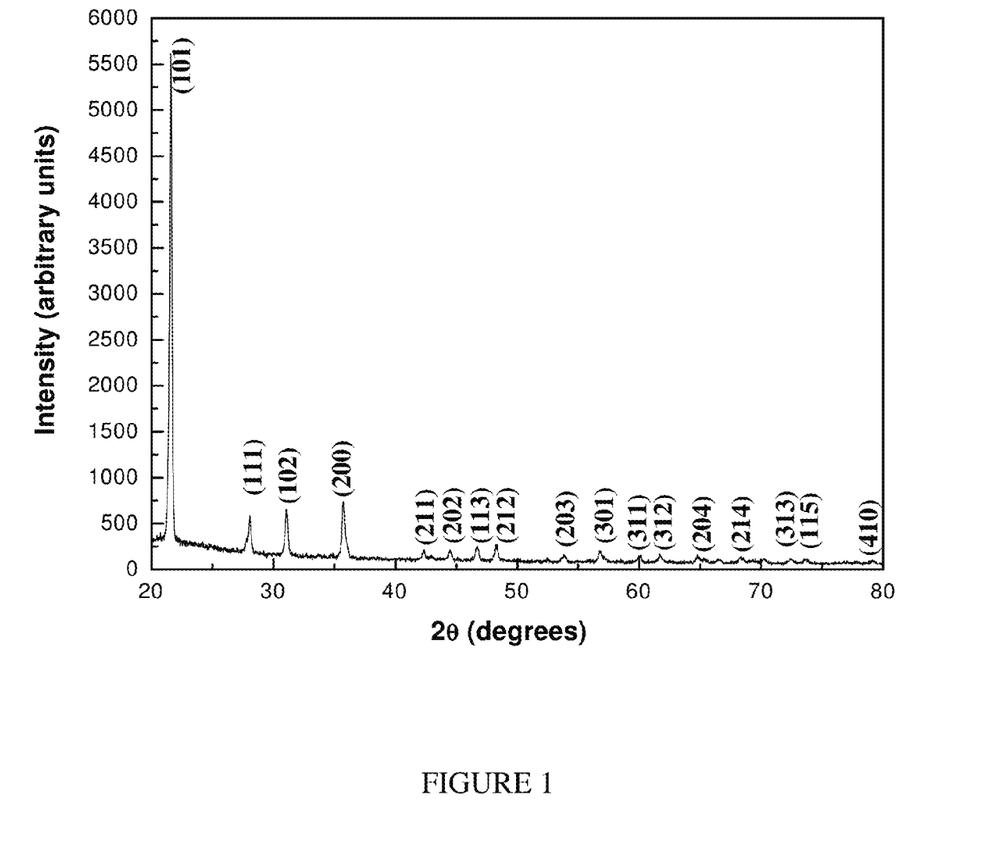
FIG. 1 is an XRD scan of rice husk treated at 1900° C. in air showing the cristabolite phase of $SiO_2$.

FIG. 1 shows an X-ray diffraction scan of microwave processed rice husk samples fired at 1900° C. in air for a duration of five minutes. The sample processed in air shows the presence of predominantly cristobalite phase of $SiO_2$. A least square refinement of the data gives lattice parameters of a=4.973±0.001 Å and c=6.924±0.006 Å in agreement with the literature value.

The crystallite size was estimated from the full width at half maximum of the diffraction peaks and using Scherrer's formula and was found to be 33 nm.

Figure 2:
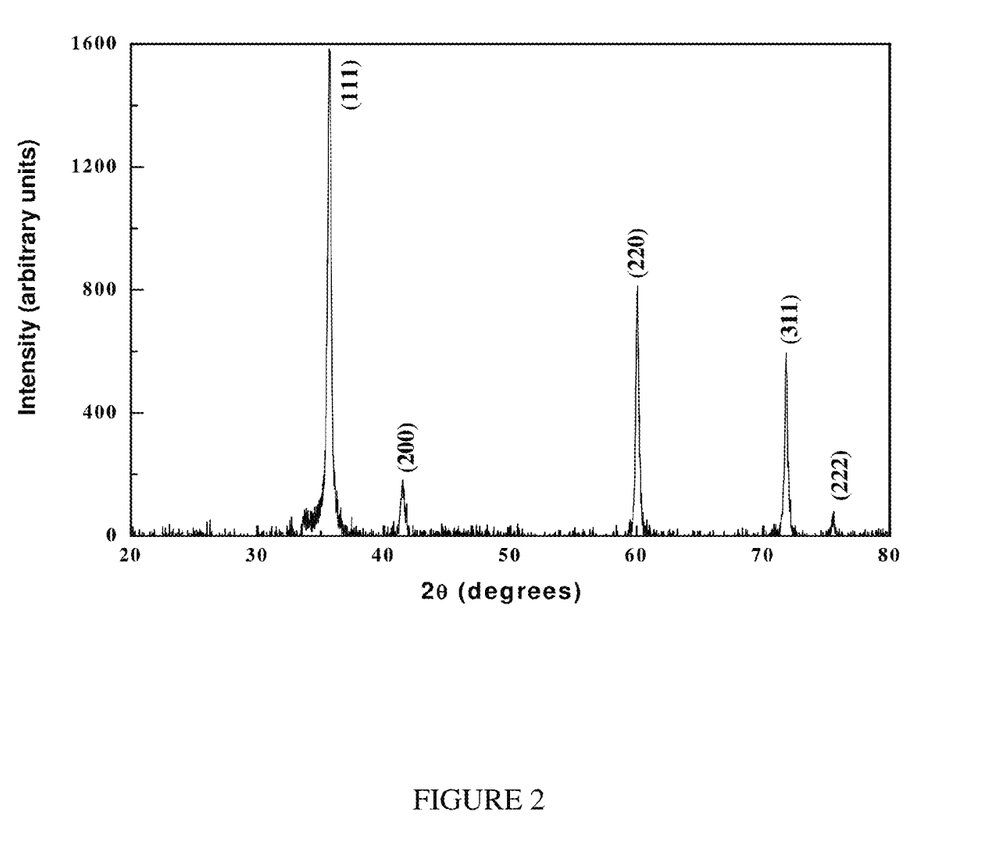
FIG. 2 is an XRD scan of rice husk treated at 1900° C. in vacuum showing the β-SiC phase.

FIG. 2 shows the x-ray diffraction scan of the sample processed in vacuum at 1900° C. The main peaks can be identified with β-SiC structure, which is cubic Moissanite-3C with a space group of F4̄3m. The x-ray data analysis shows a lattice parameter of 4.359±0.003 Å, which is in agreement with the equilibrium lattice parameter of 4.3589 Å. The small shoulder to the left side of the (111) peak is attributed to the presence of stacking faults in the SiC nanorods observed in the TEM images and described in the following paragraphs.

A bright-field TEM image of the spherical SiC particles is presented in FIG. 3 and demonstrate the high density of stacking faults present. The particle size ranged from 100 to 300 nm in diameter. Such particles get sintered at high temperature with each other.

Figure 4:
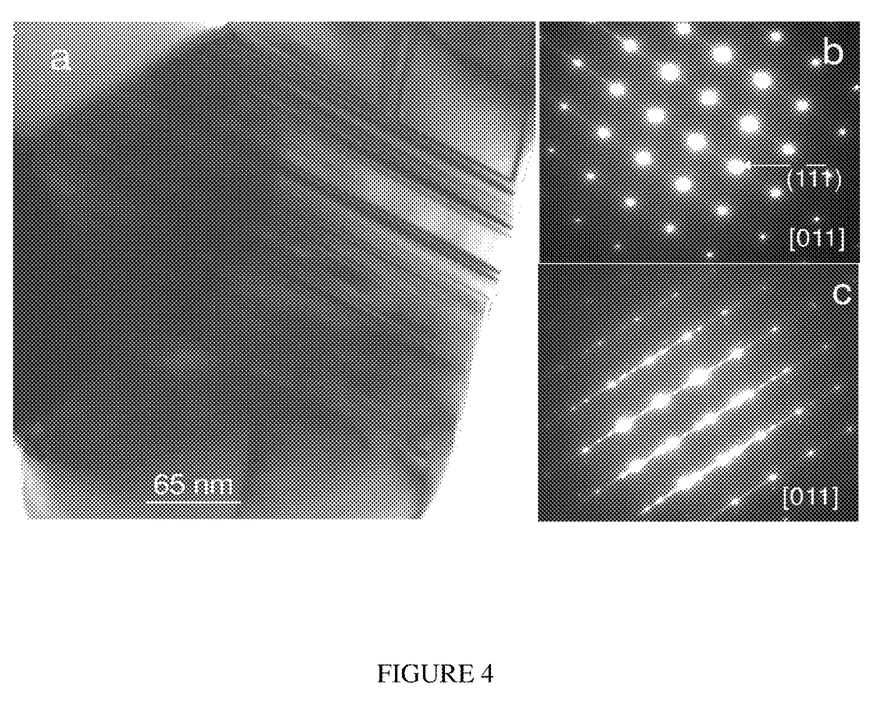
FIG. 4 illustrates: (a) particle showing stacking faults; (b) the corresponding diffraction pattern in the [011] zone; and (c) diffraction pattern from another particle showing twined spots close to [110] zone.

FIG. 4(a) shows one such particle illustrating the high density of stacking faults oriented along the (111) plane. The corresponding selected area electron diffraction pattern (SAEDP) from one such particle close to the [01$\bar{1}$] zone axis is shown in FIG. 4(b). The diffraction spots, the d-spacing and the angle between planes, conforms to β-SiC crystal. The d-spacing of (111) planes was observed to be around 2.52 Å. The streaks along the 111 direction in the diffraction pattern are due to thin stacking faults. In some particles, one could observe (111) twins, FIG. 4(c), as well as stacking faults.

In order to confirm the β-SiC phase and identify other chemical components of the resultant powder, Raman spectroscopy was performed. FIG. 5 shows the Raman spectra for the husk sample fired at 1900° C. in vacuum that exhibits strong modes at 790, 970, 1350 and 1570 $cm^{-1}$.

Consistent with the observations from X-ray diffraction, the peaks at 790 $cm^{-1}$ and 970 $cm^{-1}$ are identified as the TO and LO phonon modes of β SiC, which can clearly be distinguished from the spectra of the hexagonal or rhombohedral polytypes, such as 4H, 6H or 15R. In addition, the presence of the modes at 1350 and 1570 cm-1 can be attributed to carbonaceous species, most likely graphitic in nature due to the absence of carbon nanotube like nanostructures within the TEM images. Another possibility is that these modes are due to the presence of graphene or graphitic layers created on the surface of the β SiC nanostructures, which is consistent with recent measurements demonstrating epitaxial graphene growth on 3C—SiC substrates under temperatures in the range of 1500-1600° C.

Figure 6:
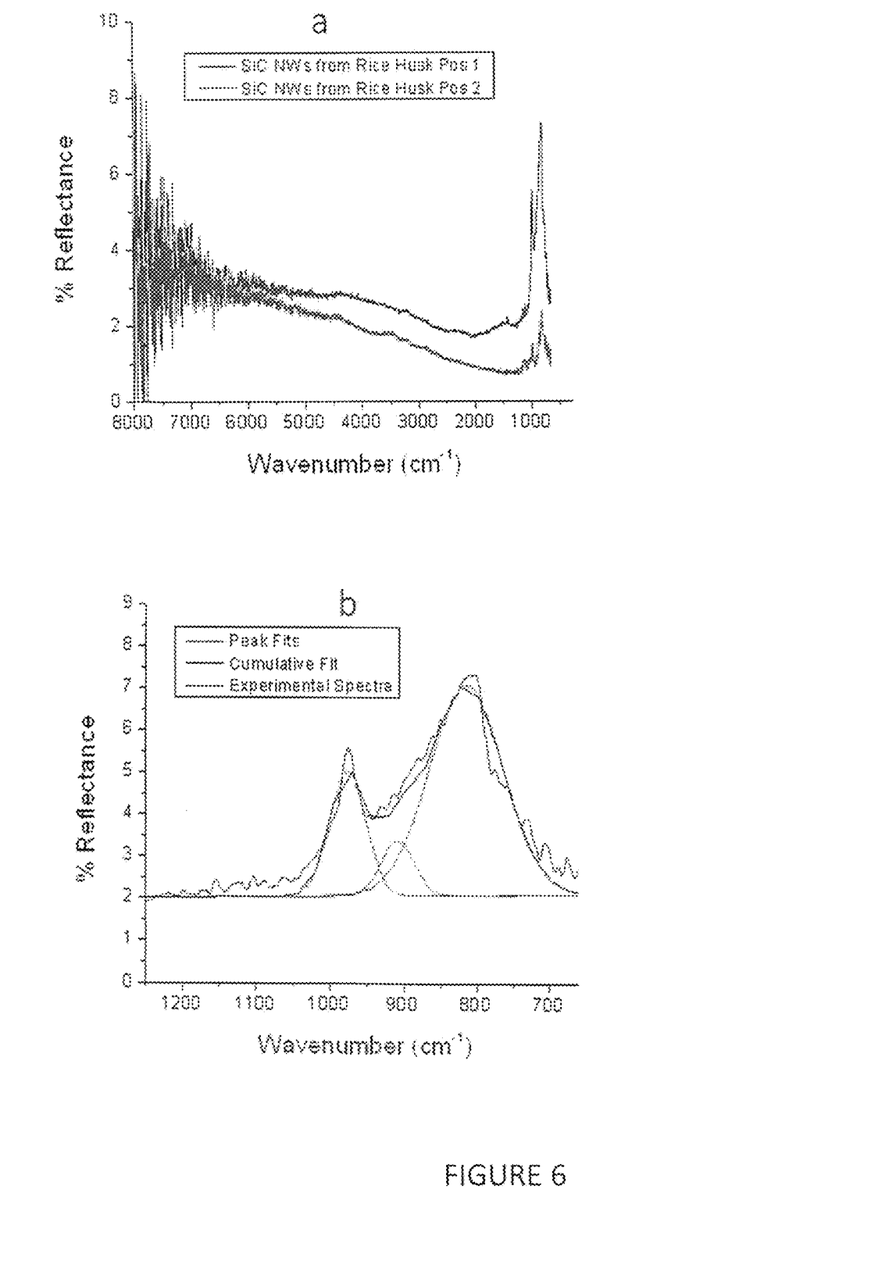
FIG. 6 illustrates: (a) FTIR reflection spectra collected from three different regions within the sample; and (b) zoomed in view of the spectra within 650-1250 $cm^{-1}$ spectral range.

FTIR reflection spectra collected from three different regions within the sample are presented in FIG. 6(a). In these spectra, a few characteristic features are observed, the first being the presence of an overall low reflectance (high absorbance) background across the entire IR spectral range investigated (8000 to 667 $cm^{-1}$; 1.25 to 15 μm) which is associated with the strong absorbance, which is presumably due to the carbonaceous species, or the graphitic or graphene layers present within the sample. Such a strong absorption cannot be explained via the SiC alone this material tends to be IR transparent over most of this spectral range.

An additional feature of the spectra is observed out beyond 1000 $cm^{-1}$. A zoomed in view of the spectra within this spectral range is provided in FIG. 6(b). From least squares fitting of these peaks to Gaussian functions, we identified the presence of peaks located at approximately 976, 907 and 814 $cm^{-1}$, which considering the error in the fits provides peak positions that are consistent for the reported location of the phonon modes of β SiC in the literature of 797, 881, and 972 $cm^{-1}$. The strong absorption over this band when coupled with the random nature and simplicity in fabrication may also indicate that such structures may provide utility as optical obscurants, limiters or in modifying thermal emissivity.

Because SiC exhibits polytypism, with over 215 polytypes having currently been identified, significant theoretical work has been done to discuss the origin of various polytypes. The manifestation of polytypsm could be attributed to the kinetic factors during the growth procedure. These polytypes can be described as distinct metastable thermodynamic phases controlled by external parameters such as pressure and temperature.

As the polytype is characterized by a stacking sequence with a long periodicity along the stacking axis, only slight modifications in that sequence can lead to dramatic variations in the local crystalline structure and therefore form a superlattice-like structure. These have been explored in a SiC (4H) to a large degree due in part to these stacking faults consisting of 3C SiC layers that upon electron-hole pair recombination are observed to expand and contract, and further induce the well-reported drift in the forward voltage within bipolar SiC devices.

In addition, in-grown stacking faults, which do not expand or contract, but are induced during growth, are also well reported and consist of various modifications in the stacking order of the material. Such stacking faults have also been reported within the β SiC polytype, exhibiting a hexagonal stacking order with a much larger band gap, and thus do not induce the same deleterious effects that are observed in the a SiC devices. Due to the large offset in the conduction band between the α and β phases (~1 eV), such stacking faults could be useful in the formation of quantum well structures or heterostructures depending which phase is predominant (e.g. β SiC stacking faults in a SiC structures will provide a quantum well, and heterojunctions will be created in the reverse structure). Because of large energy band gap, large thermal conductivity, high hardness, and high saturation value of electron density, such a superlattice structure will be useful for high-temperature and high-power device applications.

Among the several polytypes the cubic-zinc-blende structure or 3C, the 4H and 6H hexagonal structures have the lowest formation energies. The ground state properties of these polytypes have been calculated using density-functional theory (DFT) with the plane-wave pseudopotential method. It was found that the energy sequence is found to follow 4H<6H<3C, however, it is important to note that the differences in the formation energies differ only by 1-4 meV between 4H and 3C depending on the calculation method used. Such small energy variations are easily compensated by other sources, such as electron hole pair recombination, for instance, and therefore the formation of stacking faults is common.

In the nanostructures presented here, the presence of these stacking faults, which are on the order of a few atomic layers in thickness and therefore significantly thinner than the Bohr radii (~2.7 nm in 3C SiC), along with the ~1 eV band offset between the host 3C and hexagonal stacking fault stacking order imply that these stacking faults provide a conduction barrier, and the interfaces between the stacking fault and host lattice acts as a heterojunction that may provide potential utility for various opto-electronic applications.

EXAMPLE 3

Silica content of sorghum leaves is about 9 to 15% of the dry matter and is much higher than found in temperate forages and most other cereal crop residuals.

We ground the dry leaves of the sorghum plants to produce fine powder and subsequently formed circular disks. Silicon carbide 3C (cubic) phase was obtained from these disks by pyrolysis using either thermogravimetric analysis or microwave heating by controlling the processing temperature in an inert environment of argon at temperatures above 1500° C.

Using x-ray diffraction it was found that the pyrolised sample consists of cubic β-SiC phase and a trace amount of 6H SiC phase.

Figure 7:
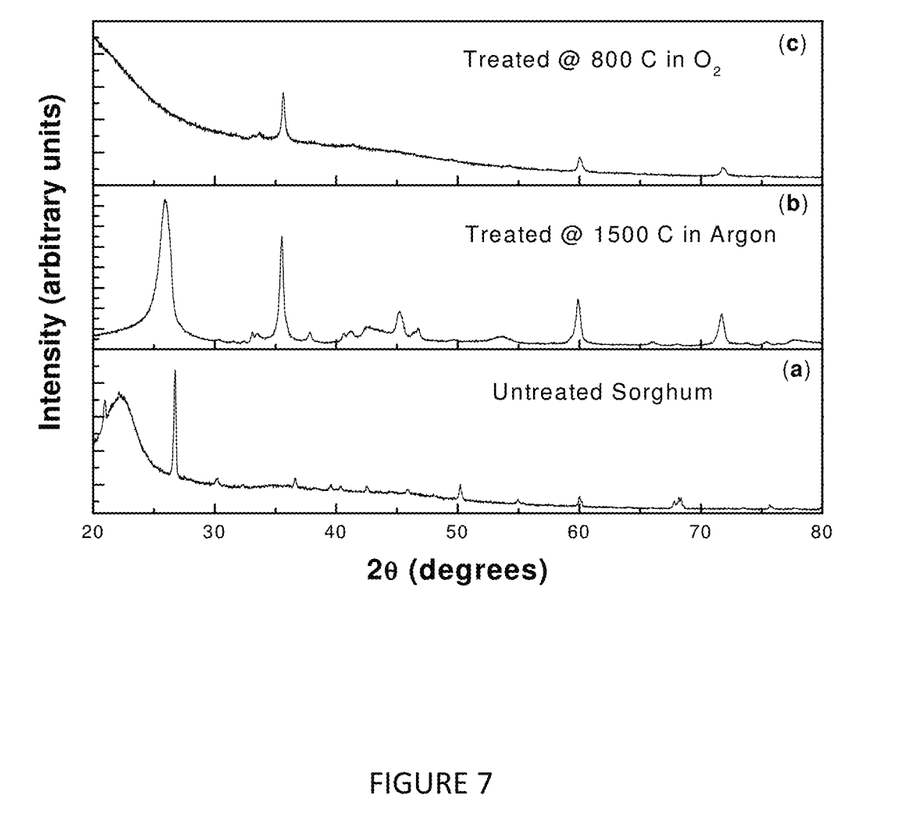
FIG. 7 illustrates X-ray diffraction patterns of the sorghum leaves taken with copper radiation (a) showing peaks from the α-Quartz phase; (b) after treating at 1500° C. in Argon atmosphere showing the presence of graphite and the presence of 6H—SiC and β-SiC phases; and (c) after treating in oxygen at 800° C., showing a trace amount of 6H—SiC and cubic β-SiC phases.

FIG. 7 shows an overlay of three diffraction patterns. The untreated sample showed the presence of silica ($SiO_2$) in the crystalline form having α-quartz phase and all the peaks in FIG. 7(a) can be accounted based on this phase. The diffraction pattern of the pyrolyzed sample at 1500° C. in Ar-atmosphere is presented in FIG. 7(b) and shows the presence of graphite and peaks corresponding to the β-SiC phase with a trace amount of 6H SiC.

Once SiC is formed, we treated in oxygen atmosphere at 800° C. to get rid of graphite and other unwanted carbonaceous impurities. The diffraction pattern in FIG. 7(c) shows the presence of β-SiC phase only. These results were confirmed by Raman Scattering measurements, scanning and transmission electron spectroscopy.

These experiments were conducted using conventional furnace heating and microwave heating. Both the stalks and the seeds of the sorghum plant showed amorphous diffraction pattern for as-received sample and subsequent heat treatment did not produce any SiC phases or for that matter any crystalline $SiO_2$.

The transmission and scanning electron microscopy results indicated the presence of nanoparticles with nanometer dimensions and nanorods with length of several microns.

EXAMPLE 4

Billions of pounds of nut shells and fruit pits which are produced annually all over the world go as an agriculture waste product. In this research, we investigated the formation of SiC from the peanut shells.

We ground the nut shells to produce fine powder and subsequently formed circular disks. Silicon carbide 3C (cubic) phase was obtained from these disks by pyrolysis using either thermogravimetric analysis or microwave heating by controlling the processing temperature in an inert environment of argon at temperatures above 1500° C.

Using x-ray diffraction it was found that the pyrolyzed sample consists of cubic β-SiC phase and a trace amount of 2H—SiC phase.

Figure 8:
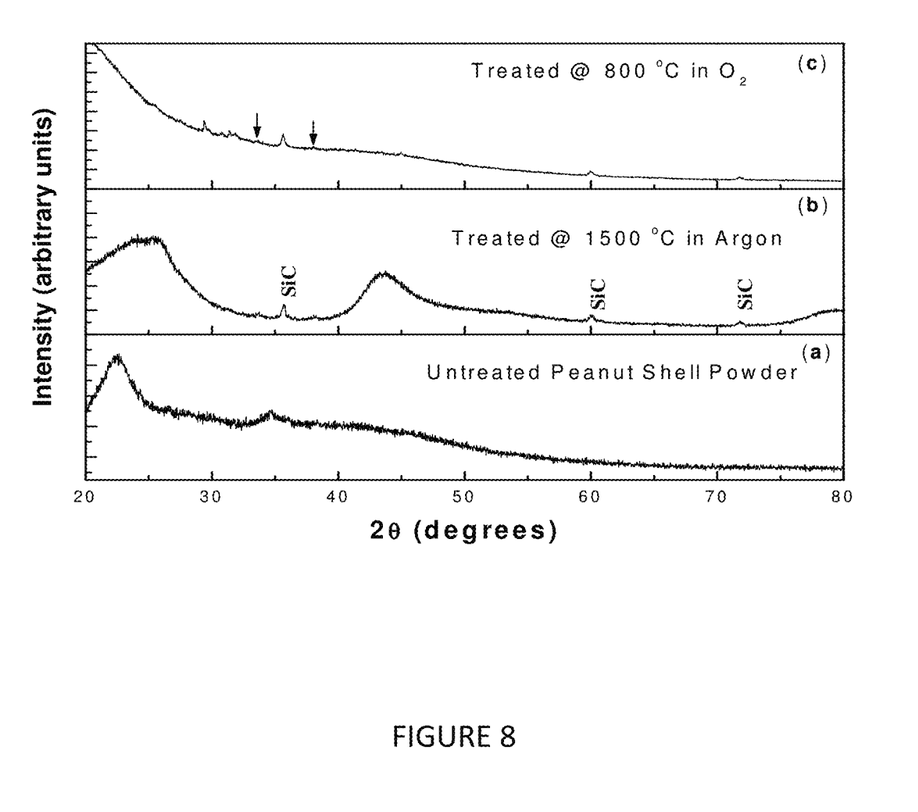
FIG. 8 illustrates X-ray diffraction patterns of the peanut shells taken with copper radiation (a) showing peaks from the amorphous phase; (b) after treating at 1500° C. in Argon atmosphere showing the presence of carbon and the presence of 2H—SiC and β-SiC phases; and (c) after treating in oxygen at 800° C., showing a trace amount of 2H—SiC which are shown by arrows and cubic β-SiC phases.

FIG. 8 shows an overlay of three diffraction patterns. The untreated sample showed the presence of amorphous peaks FIG. 8(a). The diffraction pattern of the pyrolyzed sample at 1500° C. in Ar-atmosphere is presented in FIG. 8(b) and shows the presence of carbonacious and peaks corresponding to the β-SiC phase with a trace amount of 2H SiC.

Once SiC is formed, we treated in oxygen atmosphere at 800° C. to get rid of unwanted carbonaceous impurities. The diffraction pattern in FIG. 8(c) shows the presence of β-SiC phase and trace amount of 2H—SiC phase. These results were confirmed by Raman Scattering measurements, scanning and transmission electron spectroscopy.

These experiments were conducted using conventional furnace heating and microwave heating.

The transmission and scanning electron microscopy results indicated the presence of nanoparticles with nanometer dimensions and nanorods with length of several microns.

EXAMPLE 5

Billions of pounds of maple leaves which are generated annually, especially during the Fall season, all over the world go as an agriculture waste product. In this research, we investigated the formation of SiC from the maple leaves.

We ground the dry maple leaves to produce fine powder and subsequently formed circular disks. Silicon carbide 3C (cubic) phase was obtained from these disks by pyrolysis using either thermogravimetric analysis or microwave heating by controlling the processing temperature in an inert environment of argon at temperatures above 1500° C.

Using x-ray diffraction it was found that the pyrolyzed sample consists of 2H—SiC phase.

Figure 9:
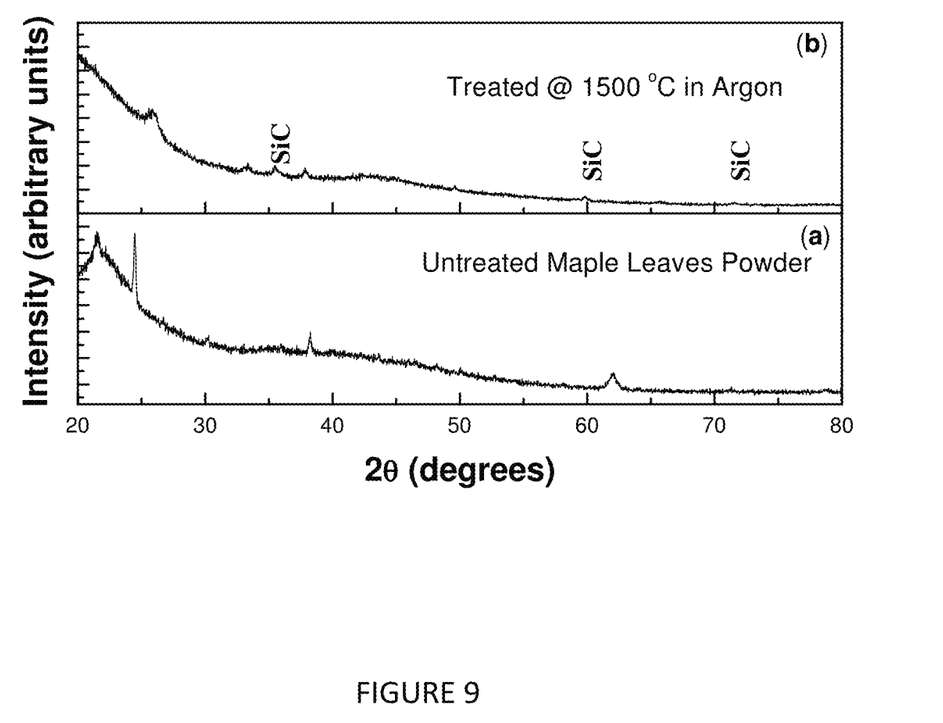
FIG. 9 illustrates X-ray diffraction patterns of the maple leaves taken with copper radiation (a) showing peaks from the α-Quartz phase; and (b) after treating at 1500° C. in Argon atmosphere showing the presence of 2H—SiC and β-SiC phases.

FIG. 9 shows an overlay of two diffraction patterns. The untreated sample showed the presence of α-Quartz peaks FIG. 9(a). The diffraction pattern of the pyrolyzed sample at 1500° C. in Ar-atmosphere is presented in FIG. 9(b) and shows the presence of 2H SiC. These results were confirmed by Raman Scattering measurements, scanning and transmission electron spectroscopy.

These experiments were conducted using conventional furnace heating and microwave heating. The transmission and scanning electron microscopy results indicated the presence of nanoparticles with nanometer dimensions and nanorods with length of several microns.

EXAMPLE 6

Billions of pounds of corn husks and stalks are available as an agricultural waste. However, corn ash is also being used in applications such as concrete for construction projects. In this research, we investigated the formation of SiC from the corn husks. SiC will be a better material in contrast to ash.

We ground the dry corn husks to produce fine powder and subsequently formed circular disks. Silicon carbide 3C (cubic) phase was obtained from these disks by pyrolysis using either thermogravimetric analysis or microwave heating by controlling the processing temperature in an inert environment of argon at temperatures above 1500° C.

Using x-ray diffraction it was found that the pyrolyzed sample consists of cubic 3C—SiC phase.

Figure 10:
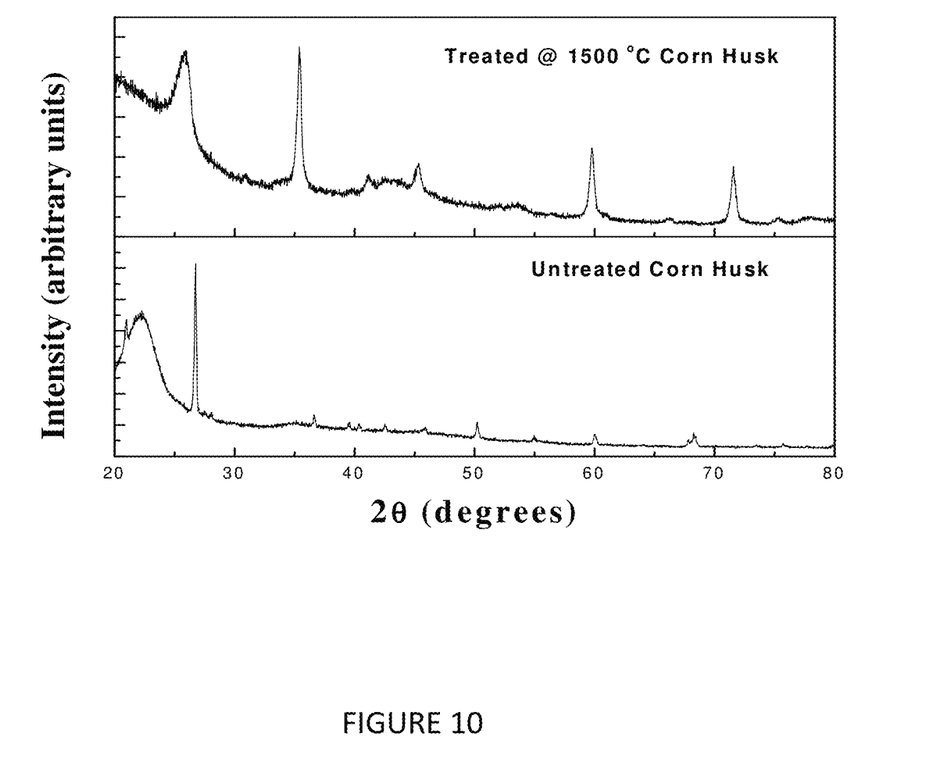
FIG. 10 illustrates X-ray diffraction patterns of the corn husk taken with copper radiation (a) showing peaks from the α-Quartz phase; and (b) after treating at 1500° C. in Argon atmosphere showing the presence of cubic β-SiC phases.

FIG. 10 shows an overlay of two diffraction patterns. The untreated sample showed the presence of α-Quartz peaks FIG. 10(a). The diffraction pattern of the pyrolyzed sample at 1500° C. in Ar-atmosphere is presented in FIG. 10(b) and shows the presence of cubic 3C—SiC. These results were confirmed by Raman Scattering measurements, scanning and transmission electron spectroscopy.

These experiments were conducted using conventional furnace heating and microwave heating.

The transmission and scanning electron microscopy results indicated the presence of nanoparticles with nanometer dimensions and nanorods with length of several microns.

As discussed, this disclosure involves a new method for the formation of abundant quantities of SiC from rice husk or other materials using either conventional heating or microwave processing and the formation of the nanoparticle and nanorods of SiC in abundant quantities in a pure form using an inexpensive processing of agriculture waste. As such, an abundant, renewable resource now can provide SiC, an important industrial material.

The method disclosed herein involves a high efficiency and low cost process. Impurities are minimized. Furthermore, the method does not require plasma formation and control.

Large quantities of the nanoparticles of β-SiC can be obtained from the agricultural waste of rice husks using microwave processing them in vacuum with controlled conditions of temperature (about 1900° C.). This simple and cheap way of producing these nanoparticles is important if this material is to be used for electronics, nanosensors, and biotechnology. X-ray diffraction, Raman scattering, and TEM, show that there is a simultaneous formation of β-SiC from the pyrolysis of rice husks in the microwave set-up. Transmission Electron Microscopy and Raman Spectroscopy show the presence of β-SiC nanoparticles with stacking faults. The presence of 6H/4H stacking faults in 3C phase makes a quantum-well like structure that can be utilized in opto-electronics as well as other applications.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A method of making SiC comprising:
   adding one selected from the group consisting of rice husk material, sorghum, nuts, nut shells, maple leaves, fruit pits, and corn husk material to a container;
   wherein the container is a covered boron nitride crucible;
   creating a vacuum or an inert atmosphere inside the container;
   applying heat;
   heating rapidly the one selected from the group consisting of rice husk material, sorghum, nuts, nut shells, maple leaves, fruit pits, and corn husk material;
   wherein the step of heating is accomplished by using a millimeter-wave beam and wherein the frequency of the millimeter-wave beam is about 83 GHz, the total beam power is about 5 kW, and the power density is about 0.3 kW/cm$^2$; and
   reacting the one selected from the group consisting of rice husk material, sorghum, nuts, nut shells, maple leaves, fruit pits, and corn husk material and forming silicon carbide;
   wherein the silicon carbide is nanoparticles and nanorods of SiC in a pure form.

2. The method of claim 1 further comprising the step of:
   heating the one selected from the group consisting of rice husk material, sorghum, nuts, nut shells, maple leaves, fruit pits, and corn husk material to a temperature of about 1400-1500° C.

3. The method of claim 2 further comprising the step of:
   maintaining the temperature of about 1400-1500° C. for about 1 to about 10 minutes.

4. The method of claim 3 further comprising the step of:
   cooling the container.

5. The method of claim 4 wherein the vacuum is a modest vacuum environment which prevents oxidation and silica formation.

6. A method of producing nanorods and nanoparticles of silicon carbide comprising:
   milling rice husks into a fine rice husk powder;
   mixing the fine rice husk powder with a Polyvinyl alcohol (PVA) binder in a ratio of 0.95 rice husk to 0.05 PVA by weight;
   pressing fine rice husk powder into a pellet;

directing a millimeter-wave beam to the pellet and thereby increasing the localized temperature;
heating the pellet to a temperature of about 1900° C.;
maintaining the temperature of the pellet at about 1900° C.; and
cooling the pellet which thereby forms nanorods and nanoparticles of silicon carbide and other products.

7. The method of claim 6 wherein the steps of heating the pellet, maintaining the heat, and cooling the pellet involve a total time of about 10 minutes.

8. The method of claim 7 wherein the frequency of the millimeter-wave beam is 83 GHz, the total beam power is about 5 kW, and the power density is about 0.3 kW/cm$^2$ with the microwave radiation directed at the pellet.

9. The method of claim 8 further comprising the step of:
using electron microscopy on a JEOL JSM-7001FLV SEM to characterize the structure of the silicon carbide and using TEM to further analyze the nanostructure wherein samples were prepared by transferring a few drops of alcohol containing the nanorods and nanoparticles of silicon carbide to a carbon coated fine mesh Cu-grid and were imaged using Phillips CM 30 and JEOL 2200 FX transmission electron microscopes.

10. The method of claim 9 further comprising the step of utilizing a SPEX jar mill in a Polycarbonate jar with Polytetrafluoroethylene milling media.

11. The method of claim 10 wherein the pellets are about 0.5 inch pellets pressed using a Carver press and die set.

* * * * *